US012730874B2

(12) United States Patent
Karweta et al.

(10) Patent No.: US 12,730,874 B2
(45) Date of Patent: Sep. 8, 2026

(54) USING DYNAMIC COMBINATIONS OF AUTHENTICATION FACTORS IN VERIFICATION PROCEDURES

(71) Applicant: International Business Machines Corporation, Armonk, NY (US)

(72) Inventors: Ewa Karweta, Chesapeake, VA (US); Jill S. Dhillon, Jupiter, FL (US); John Jacob Mutter, Mount Pleasant, SC (US); Tiberiu Suto, Franklin, NY (US); Neil Delima, Scarborough (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 364 days.

(21) Appl. No.: 18/218,452

(22) Filed: Jul. 5, 2023

(65) Prior Publication Data

US 2025/0013729 A1 Jan. 9, 2025

(51) Int. Cl.
*G06F 21/40* (2013.01)
*G06F 21/32* (2013.01)

(52) U.S. Cl.
CPC .............. *G06F 21/40* (2013.01); *G06F 21/32* (2013.01)

(58) Field of Classification Search
None
See application file for complete search history.

(56) References Cited

U.S. PATENT DOCUMENTS 8,392,965 B2 3/2013 Carter et al.
8,719,911 B2 5/2014 Novack et al.
9,288,195 B2 3/2016 Lambiase et al.
9,667,611 B1 5/2017 Friedman et al.
10,567,376 B2 2/2020 Azar et al.
10,639,551 B2 5/2020 Hamilton, II et al.
10,880,284 B1 12/2020 Hitchcock et al.
10,896,248 B2 1/2021 Salama et al.
11,057,362 B2 * 7/2021 Segu .................... H04L 63/205
11,403,541 B2 8/2022 Thomsen et al.
2017/0140138 A1 5/2017 Samuel et al.
2018/0131692 A1 5/2018 Katz-Oz et al.

(Continued)

FOREIGN PATENT DOCUMENTS

WO 2014142947 A1 9/2014

OTHER PUBLICATIONS

Shila et al., "Castra: Seamless and Unobtrusive Authentication of Users to Diverse Mobile Services," IEEE Internet of Things Journal, vol. 5, No. 5, Oct. 2018, pp. 4042-4057.

*Primary Examiner* — Nelson S. Giddins
(74) *Attorney, Agent, or Firm* — Steven M. Bouknight

(57) ABSTRACT

A computer-implemented method, according to one approach, includes: generating a multi-factor authentication challenge for a user in response to receiving a request from the user, The multi-factor authentication challenge includes a dynamic combination of available authentication factors corresponding to the user. The dynamic combination of authentication factors includes (i) at least one user defined authentication factor, (ii) at least one biometric authentication factor, and (iii) at least one activity-based authentication factor. Inputs are also received for the multi-factor authentication challenge, and a determination is made as to whether the inputs received satisfy the multi-factor authentication challenge.

20 Claims, 6 Drawing Sheets

(56) References Cited

U.S. PATENT DOCUMENTS

| | | | | |
|---|---|---|---|---|
| 2020/0067902 | A1* | 2/2020 | Valecha | H04L 63/102 |
| 2021/0400048 | A1* | 12/2021 | Liem | G07C 9/29 |
| 2022/0179989 | A1* | 6/2022 | Hay | G06F 21/34 |
| 2022/0269761 | A1* | 8/2022 | Steelberg | G06N 3/08 |
| 2023/0024672 | A1* | 1/2023 | Bonutti | G06V 40/168 |
| 2025/0378639 | A1* | 12/2025 | Singh | G06F 3/013 |

* cited by examiner

CLIENT COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

IMPROVED USER AUTHENTICATION CODE

150

PERIPHERAL DEVICE SET 114

UI DEVICE SET 123

STORAGE 124

IoT SENSOR SET 125

NETWORK MODULE 115

END USER DEVICE 103

REMOTE SERVER 104

REMOTE DATABASE 130

WAN 102

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

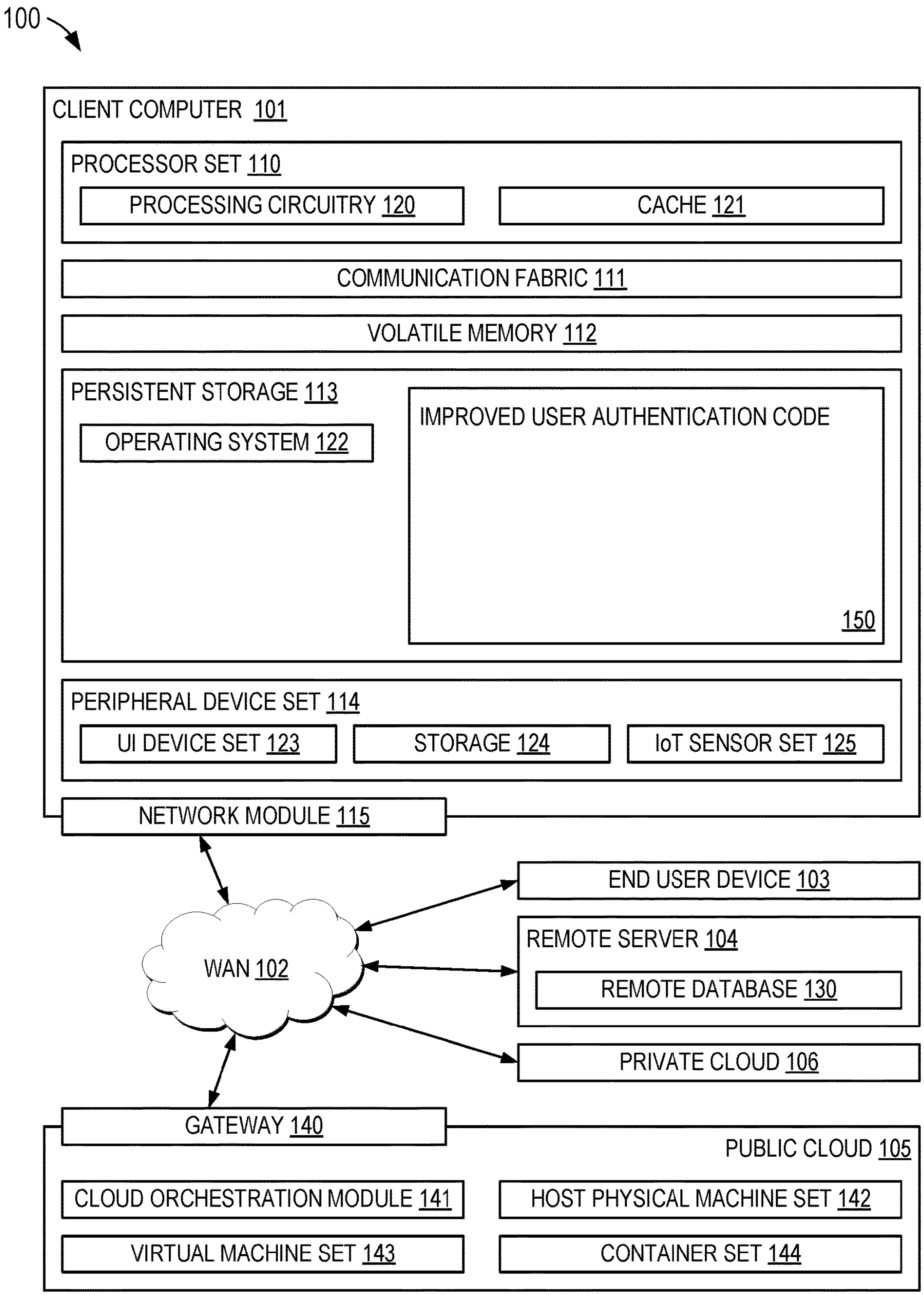

FIG. 1

USING DYNAMIC COMBINATIONS OF AUTHENTICATION FACTORS IN VERIFICATION PROCEDURES

BACKGROUND

The present invention relates to authentication procedures, and more specifically, this invention relates to using authentication factors to verify users.

As computing power continues to advance and the use of IoT devices becomes more prevalent, the amount of data produced continues to increase. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models translate to more intense workloads and increased strain associated with applying the models to received data. The operation of conventional implementations has thereby been negatively impacted.

As the production of data increases, so does the number of aspects in daily life that have been virtualized. This has caused data storage to become more complex and increased the importance of implementing effective security measures associated with accessing data. For example, passwords are logical keys that protect an increasing amount of information for users. While passwords thereby serve as a useful security measure, users are typically unable to access data and/or enact functionality as a result of forgotten passwords, overly complex security requirements, etc. Users have attempted to remedy this issue by writing down passwords on paper or securing them in password applications, but this has only enhanced the potential of damage by increasing the chances of passwords being stolen.

Additionally, while password managers have been developed to store and manage passwords, these password managers still involve a significant amount of user input. Thus, while these password managers may implement features to protect information stored therein, the process of satisfying a password entry prompt in conventional systems is complex and inefficient. The passwords themselves and how they are used to satisfy password prompts is also a stagnant process in conventional systems.

Accordingly, conventional systems are prone to experiencing limited or no data security, particularly resulting from password exposures. Users are also forced to field a significant number of prompts in response to forgetting or exposing password details. It follows that conventional systems have suffered from operational and performance based inefficiencies.

SUMMARY

A computer-implemented method, according to one approach, includes: generating a multi-factor authentication challenge for a user in response to receiving a request from the user, The multi-factor authentication challenge includes a dynamic combination of available authentication factors corresponding to the user. The dynamic combination of authentication factors includes (i) at least one user defined authentication factor, (ii) at least one biometric authentication factor, and (iii) at least one activity-based authentication factor. Inputs are also received for the multi-factor authentication challenge, and a determination is made as to whether the inputs received satisfy the multi-factor authentication challenge.

A computer program product, according to another approach, includes a computer readable storage medium having program instructions embodied therewith. The program instructions are readable by a processor, executable by the processor, or readable and executable by the processor, to cause the processor to: perform the foregoing method.

A system, according to yet another approach, includes: a processor, and logic integrated with the processor, executable by the processor, or integrated with and executable by the processor. Moreover, the logic is configured to: perform the foregoing method.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

DETAILED DESCRIPTION

Figure 2:
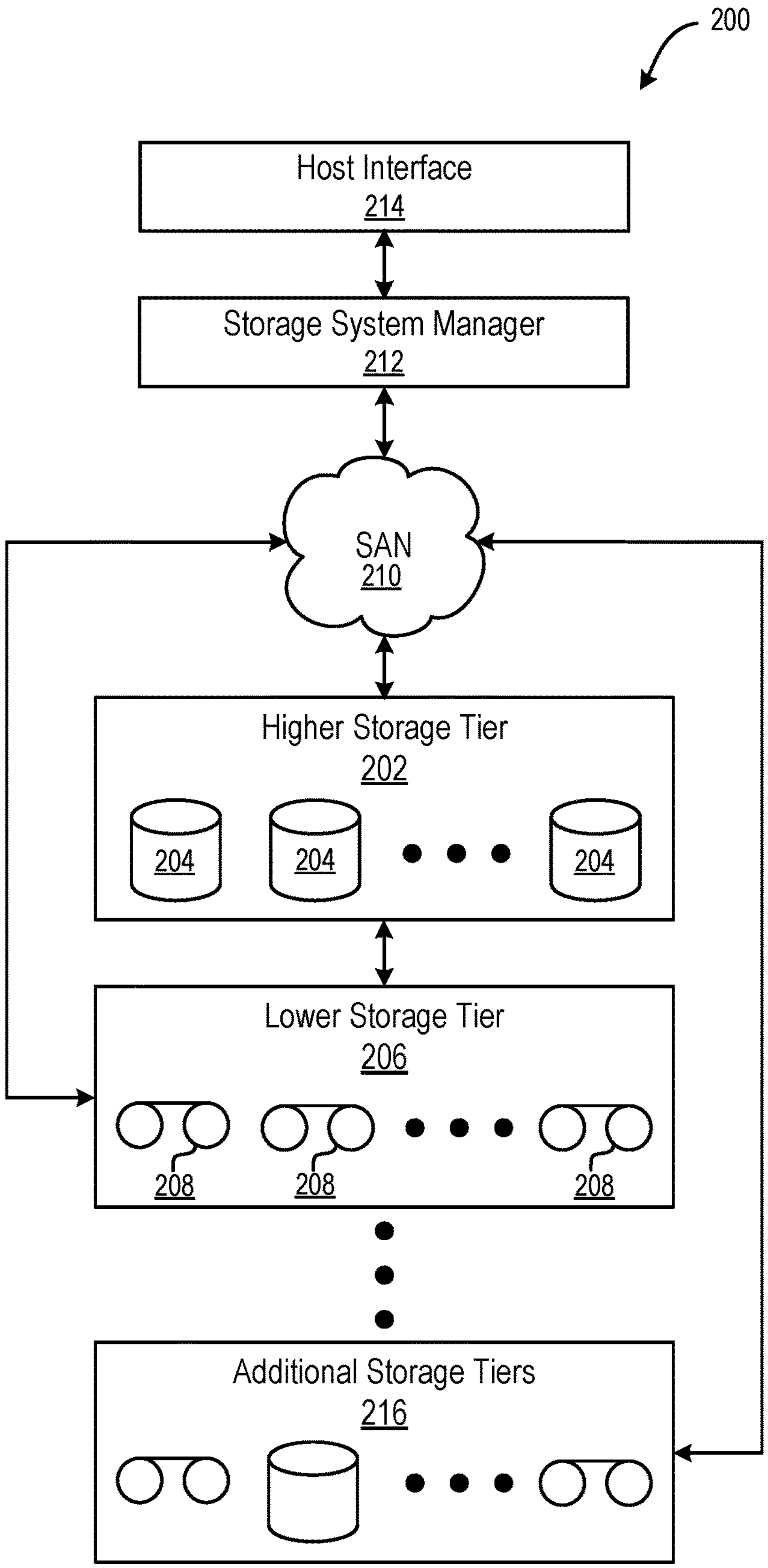
FIG. 2 is a diagram of a tiered data storage system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for maintaining information unique to different users and using that information to seamlessly perform authentication procedures. Specifically, user information is used to form a repository that allows for improved security procedures to be implemented. For instance, information collected from a user may be used to form a digital twin of that user that can be used to perform multi-factor authentication. This allows for a more robust security verification process to be implemented herein than conventionally achievable. Implementations herein can even tune the details that are included in a multi-factor authentication, allowing for security procedures to be tailored for achieving improved performance in a variety of situations, e.g., as will be described in further detail below.

It should be noted that, in embodiments and approaches described herein, any parameters and/or use of user data, e.g., biometric information, activity information, location, etc., is preferably only determined and used subsequent to a user granting permission for their data to be considered. More specifically, this permission is preferably obtained in such a way that the user has the opportunity to consider and review details of how their information will be used (to assist the user in making an informed decision), and thereafter presented with an option to opt-in, e.g., an expressly performed opt-in selection. Thereafter, the user is preferably reminded of their opt-in, and ongoingly presented with features, e.g., output for display on a user device associated with the user, that relatively easily allows the user to retract their previous election to opt-in. Note that these features may be presented to the user in any one or more formats, e.g., audibly, visually, braille, in multiple languages, etc. For example, the user may be presented with an unambiguous opt-out selection feature which, if elected by the user, terminates collection and use of data associated with the user, erases previously used data associated with the user, and notifies the user of the course of action taken to respect the user's selection of the opt-out feature. In the event that the user does not want to have their data used in one or more of the operations described herein, this decision is respected, and the user is preferably not again presented with such an option unless the user thereafter requests to reconsider the opt-in feature, e.g., based on a change in their decision.

In one general approach, a computer-implemented method includes generating a multi-factor authentication challenge for a user in response to receiving a request from the user. The multi-factor authentication challenge includes a dynamic combination of available authentication factors corresponding to the user. The dynamic combination of authentication factors preferably includes (i) at least one user defined authentication factor, (ii) at least one biometric authentication factor, and (iii) at least one activity-based authentication factor. In sharp contrast to conventional shortcomings, implementations herein are able to securely maintain information unique to different users and use that information to seamlessly perform authentication procedures. Information collected from a user may be used to form a digital twin of that user that can be used to perform multi-factor authentication. This allows for a more robust security verification process to be implemented herein than conventionally achievable. Implementations herein can even tune the details that are included in a multi-factor authentication, allowing for security procedures to be tailored for achieving improved performance in a variety of situations, e.g., as will be described in further detail below.

The computer-implemented method also includes receiving inputs for the multi-factor authentication challenge, and determining whether the inputs received satisfy the multi-factor authentication challenge. Receiving inputs for a multi-factor authentication challenge directly from a user that triggered the challenge allows for inputs to be processed in real-time, thereby improving operational throughput and reducing latency.

In some implementations, one or more of the inputs received correspond to the at least one user defined authentication factor. Accordingly, the one or more received inputs that correspond to the at least one user defined authentication factor are received directly from the user in some approaches. This provides users with a customizable and familiar interface to provide an initial verification step, improving data retention and security. In other words, some of the authentication factors in a unique combination include user defined authentication factors, e.g., such as passwords set by the users, system settings predetermined by a user, etc.

In other implementations, one or more of the inputs received correspond to at least one biometric authentication factor and/or the at least one activity-based authentication factor. These one or more received inputs that correspond to the at least one biometric authentication factor and/or the at least one activity-based authentication factor, are received from one or more sensors configured to collect biometric and/or activity-based information associated with the user. Thus, while user defined authentication factors provide users predetermined access procedures, these may be layered with additional security measures that correspond to user information collected and processed in the background. This improves data security without impacting a user's experience.

In some implementations, the request is satisfied in response to determining that the inputs received satisfy each of the authentication factors in the multi-factor authentication challenge. However, the received request (e.g., authentication challenge) is denied in response to determining that inputs received do not satisfy one or more of the authentication factors in a multi-factor authentication challenge. This sensitivity to failed authentication factors provides increased data security in some approaches. For instance, requests involving sensitive information and/or resource intensive processes may involve each of the authentication factors being satisfied before the received request is authorized to be performed. Accordingly, a preferred level of authentication can be ensured by adjusting how results to a multi-factor authentication challenge are interpreted.

In other implementations, an updated multi-factor authentication challenge is generated in response to determining the inputs received do not satisfy the multi-factor authentication challenge. The updated multi-factor authentication challenge includes an updated combination of the available authentication factors. This desirably changes the combination of user data that is referenced in an attempt to satisfy the received authentication factors. The responses may be compared against previous responses, to determine whether the user should be verified after a second attempt, or denied access.

In some implementations, generating a multi-factor authentication challenge includes using a machine learning model to create the dynamic combination of authentication factors in the multi-factor authentication challenge. Machine learning models may be used to evaluate additional information associated with requests that are received from users. For instance, machine learning models may incorporate where the request is received from, current system and/or network settings, predetermined security protocols, etc., to determine a combination of authentication factors that are implemented in a given situation. Over time, the machine learning models may thereby be able to identify preferred combinations of multi-factor authentication challenges to verify the identity of users. This understanding will allow the machine learning models to adapt to a variety of situations and determine an ideal combination of authentication factors that are able to verify a user's identity, while also minimizing the amount of input the user is prompted to provide, e.g., as would be appreciated by one skilled in the art after reading the present description. Some of the machine learning models implemented herein may even be able to adjust the combination of authentication factors by monitoring and reacting to changes in bandwidth limitations, excess compute latency in the system, network congestion, etc. Implementations may thereby be able to dynamically update to changing conditions, e.g., as described above.

In some implementations, a number of authentication factors that are implemented in a multi-factor authentication challenge is based at least in part on a type of request that is received. As noted above, different layers of security measures may be combined to achieve a desired level of data security. The desired level of data security may correspond at least in part to the type of request. For instance, some requests may involve sensitive data that involves evaluating additional authentication factors. In contrast, common data requests may be satisfied by meeting a lower number of authentication factors. As a result, compute overhead is reduced while maintaining a desirable level of data security by scaling the impact each request has on the system. This improves data security without impacting a user's experience.

In some implementations, the available authentication factors correspond to (i) user defined information, (ii) biometric information, and (iii) activity-based information collected from the user. Additionally, the user defined information, biometric information, and activity-based information collected from the user is hashed and randomized before being stored in memory. Implementations herein are thereby able to generate dynamic combinations of security procedures for users based on a variety of factors. Moreover, these combinations may be changed in real-time to respond to inputs received and adjust performance accordingly.

In another general approach, a computer program product includes a computer readable storage medium having program instructions embodied therewith. The program instructions are readable by a processor, executable by the processor, or readable and executable by the processor, to cause the processor to: perform the foregoing method.

In yet another general approach, a system includes: a processor, and logic integrated with the processor, executable by the processor, or integrated with and executable by the processor. Moreover, the logic is configured to: perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product implementation ("CPP implementation" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved user authentication code at block 150 for using dynamic combinations of authentication factors in user verification procedures, e.g., as described herein. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some implementations, storage 124 may take the form of a quantum computing storage device for storing data in the form of qubits. In implementations where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some implementations, network control functions and network forwarding functions of network module 115 are performed on the same physical hardware device. In other implementations (for example, implementations that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some implementations, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some implementations, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other implementations a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some respects, a system according to various implementations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

Now referring to FIG. 2, a storage system 200 is shown according to one approach. Note that some of the elements shown in FIG. 2 may be implemented as hardware and/or software, according to various approaches. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the approaches presented herein.

According to some implementations, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

It follows that storage system 200 is able to use different types of memory to implement different levels of performance. For instance, the storage system manager 212 is used to control where data is processed and/or stored in the system 200, where each location is capable of achieving a different performance level (e.g., outcome). Similarly, FIG. 3 below shows a distributed system 300 having different user locations 304, 306 that are connected to a central data storage location 302. Accordingly, data and other information (e.g., commands, instructions, requests, metadata, etc.) can be sent between the user locations 304, 306 and the central data storage location 302, e.g., as described in further detail below. In some approaches, redundant copies of data may intentionally be stored at different locations in a tiered data storage system to improve data retention.

As noted above, data production has continued to increase as computing power and the use of IoT devices advance. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models translate to more intense workloads and increased strain associated with applying the models to received data.

As the production of data increases, so does the number of aspects in daily life that have been virtualized. This has caused data storage to become more complex and increased the importance of implementing effective security measures associated with accessing data. For example, passwords are logical keys that protect an increasing amount of information for users. While passwords thereby serve as a useful security measure, users are typically unable to access data and/or enact functionality as a result of forgotten passwords, overly complex security requirements, etc. Users have attempted to remedy this issue by writing down passwords on paper or securing them in password applications, but this has only enhanced the potential of damage by increasing the chances of passwords being stolen.

Additionally, while password managers have been developed to store and manage passwords, these password managers still involve a significant amount of user input. Thus, while these password managers may implement features to protect information stored therein, the process of satisfying a password entry prompt in conventional systems is complex and inefficient. The passwords themselves and how they are used to satisfy password prompts is also a stagnant process in conventional systems. Accordingly, conventional systems are prone to suffering from limited or no data security, particularly resulting from password exposures.

In sharp contrast to these conventional shortcomings, implementations herein are able to securely maintain information unique to different users and use that information to seamlessly perform authentication procedures. This user information may also be used to form a repository that allows for improved security procedures to be implemented. For instance, information collected from a user may be used to form a digital twin of that user that can be used to perform multi-factor authentication. This allows for a more robust security verification process to be implemented herein than conventionally achievable. Implementations herein can even tune the details that are included in a multi-factor authentication, allowing for security procedures to be tailored for achieving improved performance in a variety of situations, e.g., as will be described in further detail below.

Figure 3:
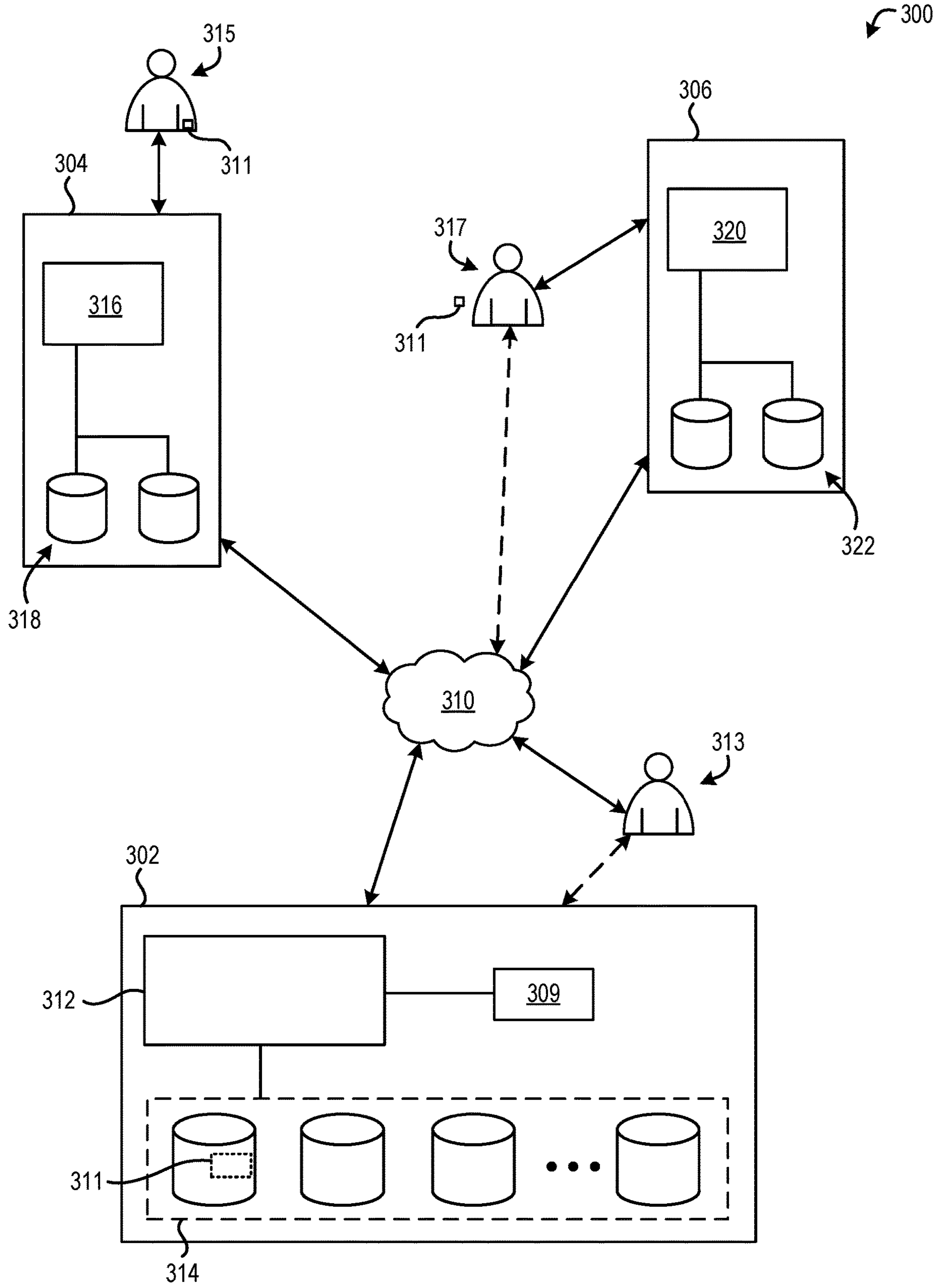
FIG. 3 is a representational view of a distributed system, in accordance with one approach.

Looking now to FIG. 3, a system 300 having a distributed architecture is illustrated in accordance with one approach. As an option, the present system 300 may be implemented in conjunction with features from any other approach listed herein, such as those described with reference to the other FIGS., such as FIGS. 1-2. However, such system 300 and others presented herein may be used in various applications and/or in permutations which may or may not be specifically described in the illustrative approaches or implementations listed herein. Further, the system 300 presented herein may be used in any desired environment. Thus FIG. 3 (and the other FIGS.) may be deemed to include any possible permutation.

As shown, the system 300 includes a central data storage location 302 that is connected to a first user location 304 and a second user location 306. Specifically, the central data storage location 302 and user locations 304, 306 are connected to a network 310. The network 310 may be of any type, e.g., depending on the desired approach. For instance, in some approaches the network 310 is a WAN, e.g., such as the Internet. However, an illustrative list of other network types which network 310 may implement includes, but is not limited to, a LAN, a PSTN, a SAN, an internal telephone network, etc. As a result, any desired information, data, commands, instructions, responses, requests, etc. may be sent between the user locations 304, 306 and/or central data storage location 302, regardless of the amount of separation which exists therebetween, e.g., despite being positioned at different geographical locations.

It should also be noted that two or more of the user locations 304, 306 and/or central data storage location 302 may be connected differently depending on the approach. According to an example, which is in no way intended to limit the invention, two edge compute nodes may be located relatively close to each other and connected by a wired connection, e.g., a cable, a fiber-optic link, a wire, etc.; etc., or any other type of connection which would be apparent to one skilled in the art after reading the present description.

With continued reference to FIG. 3, the user locations 304, 306 may have a different configuration than the central data storage location 302. For example, in some implementations the central data storage location 302 includes a large (e.g., robust) processor 312 coupled to a cache 309 and a data storage array 314 having a relatively high storage capacity. The central data storage location 302 is thereby able to process and store a relatively large amount of data, allowing it to be connected to, and manage, multiple different remote user locations (e.g., edge node servers). For instance, the central data storage location 302 may store a complete copy of data for the system 300 which is updated in real-time. This central copy of data may thereby be used to satisfy data requests that are received from the user locations 304, 306. Again, the central data storage location 302 may receive data, user information for authentication challenges, commands, etc., from any number of locations. The components included in the central data storage location 302 thereby may have a higher storage capacity and achievable throughput than components included in each of the user locations 304, 306 to accommodate the higher flow of data experienced at the central data storage location 302.

The central data storage location 302 may also store at least some information about the different user locations 304, 306 and/or users 315, 317. For instance, user defined authentication information (e.g., passwords), biometric information (e.g., resting heart rate, fingerprint provided by the user, etc.), activity-based information (e.g., geographic location), etc., may be collected from the users 315, 317 and stored in memory for future use. Depending on the approach, this information may be collected directly from the user, e.g., in response to receiving an input from the user, and/or indirectly from the user, e.g., from one or more sensors 311 associated with the users 315, 317.

Additionally, the information that is collected from the users may be hashed and randomized before being stored in memory in some approaches. For instance, some approaches include encrypting and storing biometrics, behavioral information, preferential selections, geographical location information, etc. This information can later be recombined dynamically, and even at random in some approaches, to generate multi-factor challenges that are configured to verify the identity of the individual attempting to perform a request (e.g., access certain data). Converting the information into a hashed and/or randomized form improves the security of the information received from the users, thereby avoiding unintentional exposure of private data and other sensitive information. Thus, as a system continues acquiring new information, verification parameters may be updated over time.

The type of sensors 311 used to collect information corresponding to the users 315, 317 differs based on the approach, and may include a mobile phone, a smart watch, keystroke sensor, standalone heart rate sensor, an ambient room temperature sensor, global positioning system sensor, light sensor, weight sensor, pressure sensor, accelerometers, humidity sensors, etc. It follows that the processor 312 may use the cache 309 and/or storage array 314 to manage the information received and cause one or more operations to be performed. According to an example, the processor 312 at the central data storage location 302 may be used to perform one or more operations of method 400 in FIG. 4A below.

It should also be noted that with respect to the present description, "information" may include any desired type of details. For instance, in different implementations information can include raw sensor data, metadata, inputs received directly from users, instructions, types of requests, time-based information, etc. Moreover, while implementations herein are described in the context of information corresponding to a user, this is in no way intended to be limiting. For instance, while a "user" is described in approaches herein as an individual, the user may actually be an application, an organization, etc. The use of "data" herein is in no way intended to be limiting either, and may include any desired type of details, e.g., such as physical data storage locations, logical data storage locations, logical to physical tables, data write details, etc.

With continued reference to FIG. 3, an administrator 313 of the central data storage location 302 and/or processor 312 itself is also shown as being connected to network 310. In some implementations, the administrator 313 may be directly connected to the central data storage location 302 as represented by the dashed arrowed line. It follows that the administrator 313 may be able to control at least a portion of the central data storage location 302. Users 315, 317 are also illustrated as being connected to the respective user locations 304, 306. In some approaches, the users 315, 317 connect to their respective user locations 304, 306 through a compute device (e.g., such as the user's personal computer, mobile phone, etc.) such that information can be exchanged therebetween. However, in other approaches the users 315, 317 may be able to access the user locations 304, 306 using one or more terminals having a user interface. User 317 is also shown as being connected to the network 310 in some implementations (see dashed line). Accordingly, the user 317 may access user location 306 and/or other locations in system 300 through the network 310 in such implementations. In still other implementations, the users 315, 317 may be able to access network 310 through a direct connection to their respective user locations 304, 306.

The first user location 304 includes a processor 316 coupled to memory 318, and user location 306 includes a processor 320 coupled to memory 322. The memory implemented at each of the user locations 304, 306 may be used to store a variety of data and information received. Accordingly, one or more of the user locations 304, 306 may store at least some information associated with users 315, 317 and/or the user locations 304, 306 themselves. For instance, user defined authentication information (e.g., passwords), user biometric information (e.g., resting heart rate), user activity-based information (e.g., geographic location), etc., may be collected from the users 315, 317 and stored in memory 318, 322 for future use.

Depending on the approach, this information may be collected directly from the users, e.g., in response to receiving an input from the users, and/or indirectly from the users, e.g., from one or more sensors coupled to the users. Accordingly, the data and/or information may be received from one or more sensors (not shown) in communication with the respective user locations 304, 306; the users 315, 317 themselves; other user locations connected to the network 310, the central data storage location 302, etc. It follows that the processors 316, 320 at the user locations 304, 306 may use stored information to cause one or more operations to be performed. In one example, either of the processors 316, 320 may be used to perform one or more operations of method 400 in FIG. 4A below.

As a result, implementations herein are able to securely maintain and apply a variety of information that is unique to different users. This user information may be used to form a repository that allows for improved security procedures to be implemented. For instance, information collected from a user may be used to form a digital twin of that user that can be used to perform multi-factor authentication. This allows for a more robust security verification process to be implemented herein than conventionally achievable. Implementations herein can even tune the details that are included in a particular multi-factor authentication, allowing for security procedures to be tailored for achieving improved performance in a variety of situations, e.g., as will soon become apparent.

Figure 4A:
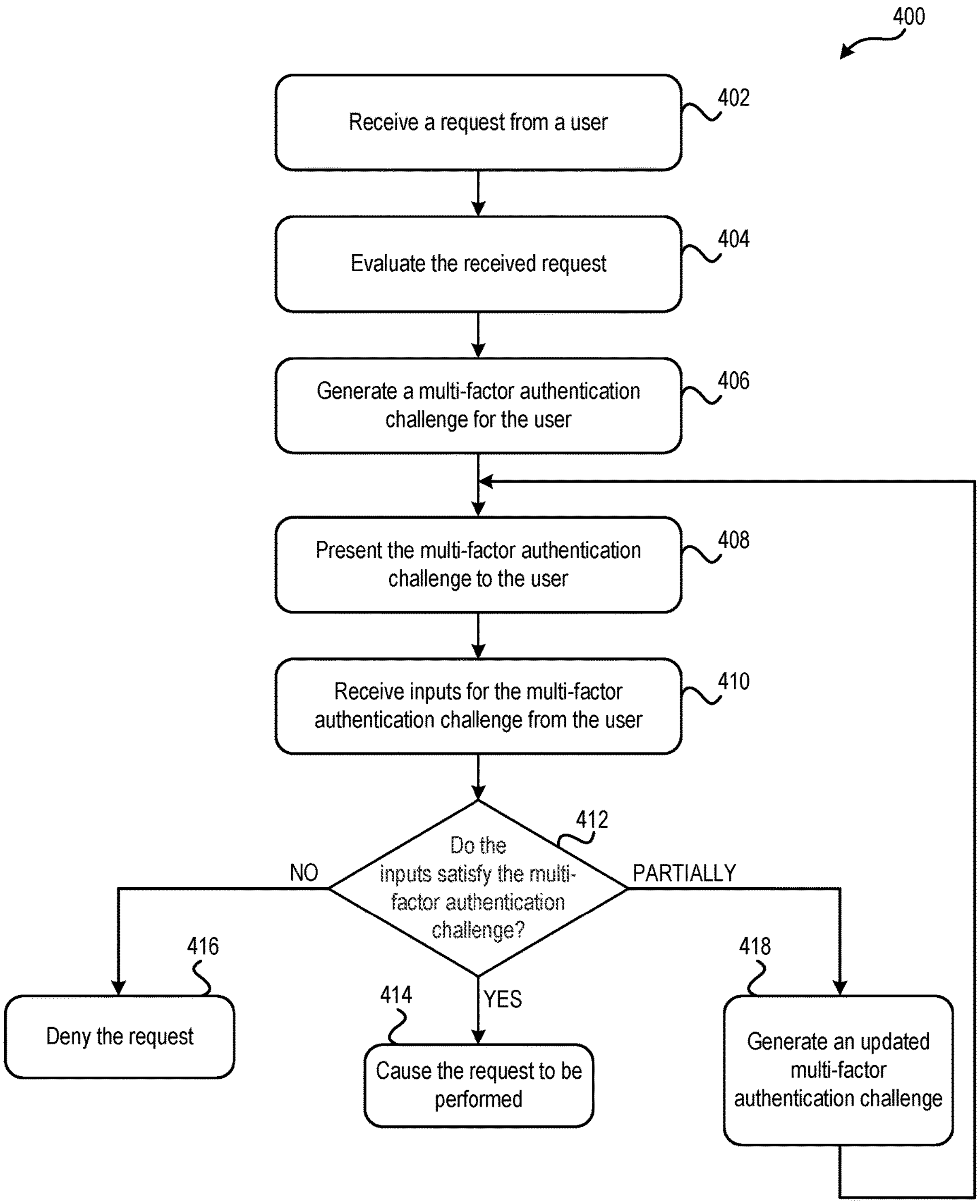
FIG. 4A is a flowchart of a method, in accordance with one approach.

Looking now to FIG. 4A, a method 400 for implementing a dynamically changing, multi-factor user authentication protocol is illustrated in accordance with one approach. Accordingly, the operations of method 400 may be performed in response to receiving a request from a user, e.g., as described below. A process of monitoring incoming requests may thereby be continually running in the background of an operating system before requesting any input from a user (e.g., human) in response to receiving a request. While certain information (e.g., warnings, reports, data resulting from read requests, dynamically updated authentication challenge, etc.) may be issued to a user, it is again noted that the various operations of method 400 can be repeated in an iterative fashion for each user request detected at any of the user locations connected to a central data storage location. Thus, method 400 may be performed in accordance with the various aspects in any of the environments depicted in FIGS. 1-3, among others, in various approaches. Of course, more or less operations than those specifically described in FIG. 4A may be included in method 400, as would be understood by one of skill in the art upon reading the present descriptions.

Each of the steps of the method 400 may be performed by any suitable component of the operating environment. For example, in various approaches, the method 400 may be partially or entirely performed by a controller, a processor, a computer, etc., or some other device having one or more processors therein. Thus, in some approaches, method 400 may be a computer-implemented method. Moreover, the terms computer, processor and controller may be used interchangeably with regards to any of the approaches herein, such components being considered equivalents in the many various permutations of the present invention.

For those approaches having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, operation 402 includes receiving a request from a user. As noted above, while the request may be received from an individual in typical implementations, requests may be received from different types of "users," e.g., such as running applications.

Different types of requests may be received from a user over time and depending on the situation. For instance, a received user request may include an access inquiry, an operation command, etc. Furthermore, some user requests involve sensitive information (e.g., patient medical records) that can only be accessed if certain security protocols are met, while other user requests incorporate open-source information that is available to anyone. The amount of compute overhead associated with satisfying different user requests may also be determined. Accordingly, requests that are received may be evaluated based on the computational impact they will have on a given system in some approaches.

Operation 404 includes evaluating the request received from the user. By evaluating the user request, operation 404 is desirably able to identify at least some characteristics of the received request and/or the user that issued the request. These characteristics can further be compared against each other, predetermined ranges, etc., to shape how and/or whether the request should be satisfied, e.g., as described below.

For example, the process of determining how and/or whether a received request is performed includes authenticating the user that issued the request in preferred approaches. This authentication may be used to verify whether the user is permitted to issue the specific request that was received in operation 402. The authentication may also impact the specific operations that are performed as a result of receiving the user request.

From operation 404, method 400 proceeds to operation 406, which includes generating a multi-factor authentication challenge for the user, having a dynamic combination of available authentication factors. In other words, an authentication challenge configured to verify the identity of the user that issued the request, is created dynamically based on the type of request received and various details known about the user. It follows that a "factor" may include a specific verification-based prompt that is based on known details of the request that was received and/or a user the request was received from. Each factor may thereby be used to authenticate different aspects of the user that issued the request. It should also be noted that the process of generating a multi-factor authentication challenge for a user may include converting information associated with the user from a hashed and/or randomized form before it can be used to generate the authentication challenge, e.g., as would be appreciated by one skilled in the art after reading the present description.

For instance, some of the authentication factors in a unique combination include user defined authentication factors, e.g., such as passwords set by the users, system settings predetermined by a user, etc. These user defined authentication factors may be received directly from (e.g., set by) the user over time. Other authentication factors in a given combination may include biometric authentication factors that are associated with the user's biometric information, e.g., such as a resting heart rate of the user, blood pressure readings of the user, the breathing rate of the user, etc. Still other authentication factors in a combination can include activity-based authentication factors, e.g., such as geographic location, speed of travel, ambient temperature readings, etc. It follows that biometric and activity-based authentication factors may correspond to data that is received from one or more sensors that are coupled to, or positioned near, the user.

As noted above, the process of dynamically identifying the features that are implemented in authentication challenges includes collecting and storing various details from users. Again, such collection should be performed only with permission of the users. Details about different users may be collected (e.g., acquired) as a result of issuing prompts to the users, a registration process users follow, details collected over time from sensors coupled to and/or positioned nearby the users, active monitoring subprocesses, etc. It follows that in some approaches, information may be collected directly from the users, e.g., in response to receiving an input from the users, while in other approaches the information may be collected indirectly from the users, e.g., from one or more sensors coupled to the users.

This information may be collected over time and used to form a repository of known information associated with each user. As information is received from a user, the system is preferably able to categorize the information into distinct groups based on whether each portion of information corresponds to one or more different authentication factors. Information collected from a user may also be used to form a digital twin of that user that can be used to authenticate the user in a number of different ways. With respect to the present description, a "digital twin" of a user includes a virtual representation stored in memory, that is designed to accurately reflect various details of the physical user. The digital twin of a user may be updated over time as new information about the user is received, the new information replacing or supplementing existing information. The digital twin may thereby provide a current (e.g., real-time) digital representation of the physical user.

Again, these details that are known about each user can be used (e.g., dynamically combined) to generate multi-factor authentication challenges that are able to confirm the identities of the users. The number and/or type of factors that are included in a given authentication challenge (e.g., prompt) presented to a user varies depending on details of the situation. For instance, some requests may only be performed by certain users. In one example, a patient's medical records may only be accessed (e.g., viewed) by the patient and/or their medical professional. A multi-factor authentication challenge issued in response to receiving a request to access medical records may thereby include issuing a prompt requesting that the user confirms known medical information about the patient referenced in the medical records, e.g., such as a date of birth, social security number, last name, eye color, etc.

Different types of requests may also have different levels of security associated therewith to avoid the request being carried out in an undesirable situation. Accordingly, the type of request and/or other characteristics associated with the request received in operation 402 may also impact the number of authentication factors that are included in the multi-factor challenge. In another example, backing-up a shared data storage environment may consume a significant amount of compute resources for a period of time and may even cause downtime for a system. Accordingly, a multi-factor authentication challenge may be developed dynamically to ensure the user that issued the request to back-up the shared data storage environment is authorized to do so before actually performing the back-up.

With continued reference to FIG. 4A, it follows that operation 406 includes evaluating the request that was received, and making a determination as to how many and what types of factors should be authenticated for the request to be performed. The multi-factor authentication challenge is thereby dynamically developed based on the specific details of the given situation, e.g., such as type of request that is received at operation 402. In preferred approaches, one or more machine learning models may be used to evaluate the received request and dynamically determine a specific combination of authentication factors to implement in different situations. This allows for a more robust security verification process to be implemented in approaches herein, compared to what has been conventionally achievable. Implementations herein can even tune the details that are included in a multi-factor authentication, allowing for security procedures to be tailored for achieving improved performance in a variety of situations.

The machine learning models also preferably evaluate additional information associated with requests that are received. For instance, machine learning models may incorporate where the request is received from, current system and/or network settings, predetermined security protocols, etc., to determine a combination of authentication factors that are implemented in a given situation. While it is preferred that the machine learning model is at least somewhat trained using performance data, it should also be noted that any desired type of machine learning model may be implemented, e.g., even an untrained machine learning model. The machine learning model may incorporate an artificial neural network, deep learning, a Naive Bayes classifier, etc., depending on the approach.

From operation 406, method 400 proceeds to operation 408. There, operation 408 includes presenting the multi-factor authentication challenge to the user. In other words, operation 408 includes requesting specific authentication information from the user. Furthermore, operation 410 includes receiving inputs for the multi-factor authentication challenge from the user. The multi-factor authentication challenge may be presented to the user in some approaches by sending the challenge to the user directly, e.g., over email, in a popup window shown on a display screen accessible to the user, by pushing the authentication to a user's mobile device, etc. In other approaches, the multi-factor authentication challenge may be stored in a specific location in memory, and a pointer to the specific memory location may be sent to the user to access the different factors of the authentication challenge.

Similarly, inputs may be received from the user differently depending on the situation. For instance, inputs received that correspond to user defined authentication factors (e.g., set passwords) are received directly from the user. However, inputs for other authentication factors may be received from different sources. For example, one or more received inputs may originate from sensors configured to collect biometric and/or activity-based information associated with the user. Received inputs may thereby correspond to at least one biometric authentication factor and/or at least one activity-based authentication factor.

The inputs (e.g., information) that are received for the multi-factor authentication challenge from the user are preferably evaluated to determine whether they correspond to and even satisfy the corresponding portions of the authentication challenge. Accordingly, operation 412 includes determining whether the inputs received in operation 410 satisfy the multi-factor authentication challenge. As noted above, the authentication challenge may include any desired number of authentication factors. Accordingly, each of the factors in the authentication challenge are preferably compared against the inputs received from the user. Inputs received from the user may also be compared against known information stored in the digital twin of the user to verify accuracy of the inputs.

As shown, method 400 proceeds from operation 412 to operation 414 in response to determining that the inputs received satisfy the multi-factor authentication challenge. In some approaches, the multi-factor authentication challenge is satisfied in response to each of the authentication factors being satisfied. In other words, the authentication challenge is not satisfied if one or more of the authentication factors are not satisfied in some approaches. For instance, requests involving sensitive information and/or resource intensive processes may involve each of the authentication factors being satisfied before the received request is authorized to be performed. However, it should be noted that in other approaches requests may be approved in response to fewer than all of the authentication factors issued to a user being satisfied.

Looking now to operation 414, the request is performed. In other words, the request received at operation 402 is satisfied in response to determining that the user is permitted to issue the request. Performing the request may involve sending one or more instructions to a target location, e.g., depending on the type of request received. For example, one or more instructions may be sent to a data storage controller to perform one or more data write operations, data read operations, data modify operations, etc.

Returning to operation 412, the request may be handled differently in response to determining that the multi-factor authentication challenge has not been satisfied. For instance, method 400 proceeds to operation 416 in response to determining that the multi-factor authentication challenge has failed. There, operation 416 includes denying the request that was originally received. In some approaches, a warning may be sent to the user that initially submitted the request to inform the user the request has been denied.

Although not all of the multiple authentication factors may be satisfied, some approaches involve generating an updated (e.g., new) multi-factor authentication challenge in response to determining that the original authentication challenge has only partially succeeded. For instance, an updated multi-factor authentication challenge may be generated in response to determining that a certain percentage (e.g., a majority) of the multiple authentication factors have been satisfied. See operation 418. The updated multi-factor authentication challenge preferably includes a different combination of the available authentication factors compared to the multi-factor authentication challenge that was originally issued to the user. Accordingly, a second dynamic combination of available authentication factors is determined for a second iteration of at least some of the operations in method 400 (e.g., operations 408, 410, 412, 418). It follows that if at least a portion of method 400 is repeated a third time, a third dynamic combination of available authentication factors is determined. It follows that a "dynamic combination of factors" as used herein refers to a new (e.g., unique) combination of authentication factors combined to produce a desired resulting verification process. In other words, each dynamic combination of factors is different depending on a variety of details, e.g., as described herein.

As a result, implementations herein are able to determine the true identity of a user even in situations where some of the user's characteristics have changed temporarily and/or permanently. For example, generating a new combination of authentication factors allows for implementations herein to more easily adapt to situations where a user's gait while walking is different as a result of an injury, a user's voice is different than a stored voice profile as a result of a sore throat, etc. Implementations herein are thereby able to adaptively perform user identification which allows for improved performance of the system as a whole.

The number of authentication factors that trigger the updated multi-factor authentication being generated may also depend on the type of request, the user the request was received from, predetermined conditions, industry standards, past performance, etc. Moreover, the updated multi-factor authentication challenge may be generated using any one or more of the approaches described above with respect to operation 406. Accordingly, one or more machine learning models may be used to evaluate inputs received from the user, a number of the original authentication factors that are satisfied, the type of request received, etc.

From operation 418, method 400 is shown as returning to operation 408 such that the updated multi-factor authentication challenge is presented to the user. In other words, operation 408 may include requesting specific authentication information from the user in response to the updated multi-factor authentication challenge being generated in operation 418. It follows that operations 408, 410, 412, 418 may be repeated more than once depending on the request and/or user that issued the request.

It follows that operations in method 400 are desirably able to securely maintain and apply a variety of information that is unique to different users. This user information may be used to form a repository that allows for improved security procedures to be implemented. For instance, information collected from a user may be used to form a digital twin of that user that can be used to perform multi-factor authentication that dynamically adapts to the given situation. Implementations herein can thereby tune the details that are included in a particular multi-factor authentication, allowing for security procedures to be tailored for achieving improved performance in a variety of situations, e.g., as will soon become apparent. This allows for a more robust security verification process to be implemented herein than conventionally achievable.

Figure 4B:
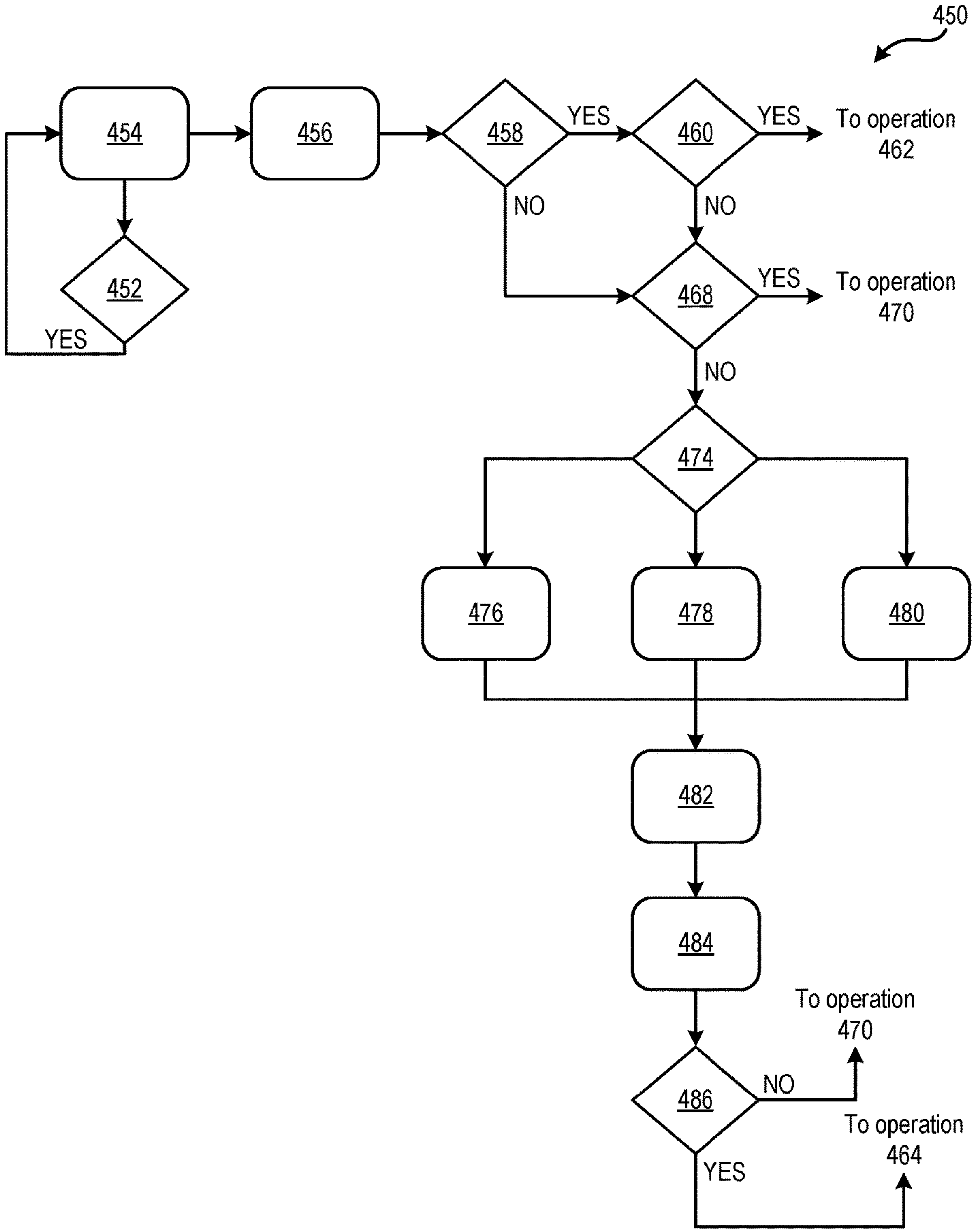
FIG. 4B is a flowchart of a method, in accordance with one approach.
Figure 4B:
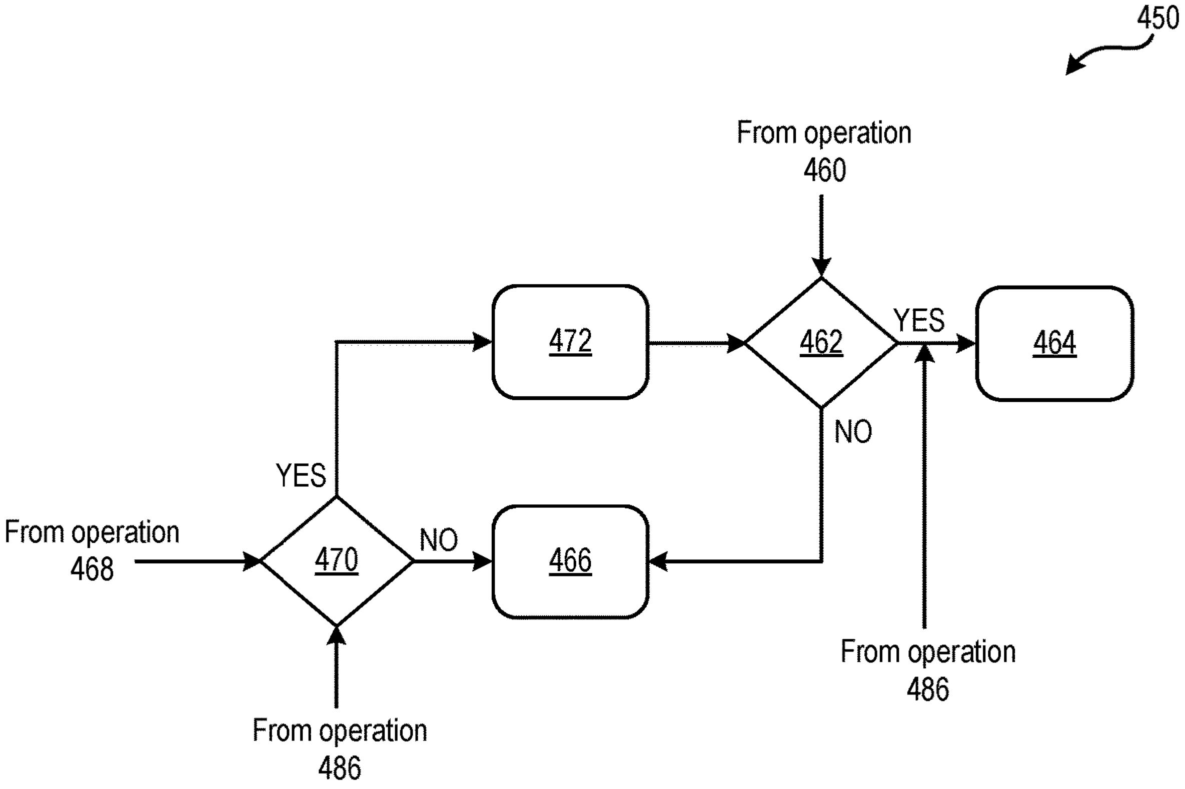

Looking now to FIG. 4B, another method 450 for implementing a dynamically changing, multi-factor user authentication protocol is illustrated in accordance with one approach. Accordingly, the operations of method 450 may be performed in response to receiving a request from a user, e.g., as described below. A process of monitoring incoming requests may thereby be continually running in the background of an operating system before requesting any input from a user (e.g., human) in response to receiving a request. While certain information (e.g., warnings, reports, data resulting from read requests, dynamically updated authentication challenge, etc.) may be issued to a user, it is again noted that the various operations of method 450 can be repeated in an iterative fashion for each user request detected at any of the user locations connected to a central data storage location. Thus, method 450 may be performed in accordance with the various aspects in any of the environments depicted in FIGS. 1-3, among others, in various approaches. Of course, more or less operations than those specifically described in FIG. 4A may be included in method 450, as would be understood by one of skill in the art upon reading the present descriptions.

Each of the steps of the method 450 may be performed by any suitable component of the operating environment. For example, in various approaches, the method 450 may be partially or entirely performed by a controller, a processor, a computer, etc., or some other device having one or more processors therein. Thus, in some approaches, method 450 may be a computer-implemented method. Moreover, the terms computer, processor and controller may be used interchangeably with regards to any of the approaches herein, such components being considered equivalents in the many various permutations of the present invention.

For those approaches having a processor, the processor, e.g., processing circuit(s), chip(s), and/or module(s) implemented in hardware and/or software, and preferably having at least one hardware component may be utilized in any device to perform one or more steps of the method 450. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4B, operation 452 includes determining whether updated information corresponding to authentication factors has been received from a user. In response to determining that updated information has been received, method 450 proceeds to operation 454. There, operation 454 includes dividing the received information into distinct groups depending on the corresponding credentials (e.g., by running one or more algorithms) and storing the information. Operations 452 and 454 may thereby be repeatedly performed over time as updates to stored information is received. This desirably ensures that a digital twin of a user in memory is up to date and accurate.

Looking to operation 456, method 450 advances in response to receiving a request from a user. In some approaches, the request may be a verification request received from a user application. In response to receiving the request, method 450 proceeds to operation 458, which includes determining whether a recently verified token group exists. Method 450 proceeds from operation 458 to operation 460 in response to determining that a recently verified token group does exist. There, operation 460 includes determining whether a supplemental authorization requirement (which may be associated with the user) has been met.

In response to determining that the supplemental authorization requirement has been met, method 450 proceeds directly to operation 462. Operation 462 includes determining whether the user is authorized to issue the request. As noted above, this determination is performed in some approaches by comparing information received directly from the user and/or stored in a digital twin of the user to various authentication factors. In other words, operation 462 includes determining whether the user is authorized to issue the request received at operation 456.

Accordingly, method 450 proceeds from operation 462 to operation 466 in response to determining that the user is not authorized to issue the request that was originally received. There, operation 466 includes rejecting (e.g., failing) the request received in operation 456. However, method 450 proceeds from operation 462 to operation 464 in response to determining that the user is authorized to issue the request. There, operation 464 includes authorizing the user request to be performed and actually causing the request to be performed. In some approaches, the request is sent to an application for implementation of an approved user request verification, e.g., as would be appreciated by one skilled in the art after reading the present description.

Returning now to operation 458, method 450 proceeds to operation 468 in response to determining that a recently verified token group does not currently exist. Similarly, operation 460 proceeds to operation 468 in response to determining that a supplemental authorization requirement has not been met (e.g., satisfied). There, operation 468 includes determining whether compromised and/or altered information (e.g., credentials) exist. In some approaches, operation 468 includes determining whether compromised and/or altered credentials are present.

In response to determining that compromised and/or altered information does exist, method 450 proceeds from operation 468 to operation 470. There, operation 470 includes determining whether sufficient information about the user is available to create an alternate multi-factor authentication challenge. In other words, a user having a digital twin with insufficient information may not be able to create an updated multi-factor authentication challenge even in situations where it is desirable to do so. Method 450 proceeds from operation 470 to operation 466 in response to determining that there is insufficient information about the user to create a new multi-factor authentication challenge. However, method 450 proceeds from operation 470 to operation 472 in response to determining that there is sufficient information about the user to create a new multi-factor authentication challenge. There, operation 472 includes generating the new multi-factor authentication challenge and issuing it to the user for verification, before proceeding back to operation 462 as described above.

Looking back to operation 468, method 450 is shown as advancing to operation 474 in response to determining that compromised and/or altered information does not exist. There, operation 474 includes determining one or more groups of information (e.g., credentials) to use in verifying the user. In some situations, a digital twin of a user may include insufficient information to generate one or more multi-factor authentication challenges. Thus, by determining one or more types of user information to use in a multi-factor authentication challenge, method 450 proceeds from operation 474 to one or more of operations 476, 478, 480 below.

In response to determining that biometric authentication information should be used, method 450 proceeds from operation 474 to operation 476. There, operation 476 includes sending a randomized request to the user for biometric authentication information. In other words, operation 476 may include requesting heart rate data, blood pressure readings, prescribed medication(s), etc., from the user. Upon receiving this information from the user, it may be compared against known information about the user (e.g., represented in a digital twin) to determine whether the user is authorized to issue the request received.

Returning to operation 474, in response to determining user defined information should be used, method 450 proceeds from operation 474 to operation 478. There, operation 478 includes sending one or more randomized requests to the user for additional user defined information. In other words, operation 478 may include requesting password entries, email verification addresses, etc. Upon receiving this information from the user, it may be compared against known information about the user (e.g., represented in a digital twin) to determine whether the user is authorized to issue the request received.

Returning once again to operation 474, in response to determining activity-based information should be used, method 450 proceeds from operation 474 to operation 480. There, operation 480 includes sending one or more randomized requests to the user for additional activity-based information. In other words, operation 480 may include requesting a number of steps taken in a 24 hour period, a walking cadence, strid length, geographic location, etc. Again, upon receiving this information from the user, it may be compared against known information about the user (e.g., represented in a digital twin) to determine whether the user is authorized to issue the request received.

It should again be noted that operation 474 includes determining one or more types of information to use in determining whether a user is permitted to issue the request received. Accordingly, one or more of operations 476, 478, 480 may be performed in the same implementation, e.g., depending on the amount and/or type of user information stored.

From operations 476, 478, 480, method 450 proceeds to operation 482. There, operation 482 includes receiving information from the user. The information received in operation 482 preferably corresponds to the requests sent in operations 476, 478, 480. Furthermore, operation 484 includes applying the information received from the user in operation 482 to a running algorithm. The algorithm is preferably able to use the different types of information received from the user and determine desired value ranges. In other words, operation 484 includes incorporating the information received in operation 482 into a digital twin of the user, thereby supplementing the amount of detailed information that can be used to authenticate the user.

From operation 484, method 450 advanced to operation 486. There, operation 486 includes determining whether the information received from the user and/or a digital twin of the user match expected values. In other words, operation 486 includes determining whether the user is authorized to issue the request that was received. In response to determining that the user is authorized to issue the request, method 450 advances directly to operation 464, which includes causing the user request to be performed as noted above. However, in response to determining that the user is not authorized to issue the request that was received, method 450 proceeds from operation 486 directly to operation 470. In response to returning to operation 470, a determination may be made as to whether sufficient information about the user is available to generate an alternate (new) multi-factor authentication challenge, e.g., as described above and herein.

A number of in-use examples are also provided herein in an attempt to provide additional context, but none of which are intended to limit the present invention. It follows that the in-use examples that follow may involve applying any one or more of the approaches included herein to achieve the desired result (e.g., output), e.g., as would be appreciated by one skilled in the art after reading the present description.

A first in-use example corresponds to a verification process that is performed in connection with a user purchasing an online game. In this in-use example, a user has recently moved into a new home and set up their Wi-Fi. The user links their gaming systems to the Wi-Fi, and after a long day of unpacking boxes, the user sits down to play video games. The user activates their gaming system and proceeds to login to a gaming server. In response to logging in, the user may select an option on a login screen which indicates that they wish to opt-in to using their digital twin as a form of logging in to the video game server moving forward. In response, the system sends out a unique verification mix to authenticate the user across several groups of verification criteria (user provided information, user owned details, dynamic real-time data, other accounts, time specific, etc.). This allows the user to experience a more streamlined login process, where the user is only prompted to provide a single user provided item (e.g., like a password), while the system itself receives a robust combination of identification information managed by the digital twin. This allows the system to verify the user's identity despite various changes they may be experiencing as a result of their recent move. For instance, following the user's initial login, they may wish to purchase a new online game that involves interacting with the user's bank. The bank may request an extra layer of verification before authorizing the video game purchase in view of the user's recent move and login from a different geographical location. Accordingly, a controller may be able to interface with the digital twin in response to the user opting in, thereby allowing the system to verify the user's identity using a passive verification criteria mix in addition to the user's recent login to the gaming server that is also associated with (e.g., connected to) the digital twin. The user is thereby able to purchase the video game without entering any additional input and is able to perform the transaction seamlessly. As a result, the user is able to purchase the video game without following any specific security measures themselves, as the verification is performed behind the scenes using the information available in the user's digital twin.

According to another in-use example, which is again in no way intended to limit the present invention, a user may wish to withdraw several thousand dollars from their account. The user has recently enrolled in the digital twin verification option the bank offers, but is unaware that someone recently tried to access the user's account for nefarious purposes. As a result, the bank has placed a temporarily hold on their account while the situation is investigated. The user visits their local bank branch and as they walk into the physical bank, a monitoring system is able to detect this and request verification from the digital twin. The bank system thereby generates a combination of verification factors that are configured to verify a physical location of the user while the hold on the account exists. This may automatically result in a larger number of verification factors to be issued to the user. For instance, the user's gait, mannerisms (body language), device code, route taken to the bank, along with application certificates and other details, provide a robust number of authentication factors. Most of these authentication factors are verified behind the scenes without requesting any input from the user, while the user may be prompted to perform some additional security steps. For instance, the user may be prompted to providing their debit card and pin number to lift the hold placed on their account and receive a full verification to withdraw the desired money.

According to another in-use example, which again is in no way intended to limit the present invention, a user has an upcoming doctor appointment with a new healthcare provider. In the past, the user has agreed to a digital twin collection and monitoring process. In situations where the user is feeling sick and their voice has changed as a result, a voice sample received at the doctor's office may not match a recording that was previously recorded for the user. In this situation, the digital twin may incorporate an alternate combination of authentication (e.g., verification) factors that are accepted by the healthcare provider. In response to satisfying these alternate authentication factors, the user may be issued a request for a face identification, along with other passive verifications, e.g., such as device certification, location match, etc.

In another in-use example, which is in no way intended to limit the present invention, a user has an upcoming telehealth appointment with a doctor, and has been asked to log into a portal to access a shared video link. However, the user may not be feeling well and having trouble typing on their keyboard. Thus, after multiple failed login attempts the system notices the user is experiencing issues which deviates from their typical access behavioral pattern of entering their username and password correctly on the first attempt. Given the context, the system can recognize the user's atypical (anomalous) login pattern, thereby indicating that the user may be at risk of experiencing a compromised state. A dynamic digital twin of the user may thereby be continuously monitored in the background, using machine learning models to generate variable and adaptable factors to authenticate the user. Accordingly, the user and/or their digital twin may be used to satisfy the authentication factors determined by the machine learning models, thereby enabling full account access.

According to yet another in-use example, a user is an avid global business traveler, traveling through over one hundred and fifty different international airports annually. During their travel, the user carries their passport in an RFID case to protect their identity and financial means from theft while abroad. The user also experiences occasional physical challenges under certain conditions. An ankle injury they sustained three years ago affects their gait when in a hurry, physically stressed, or jetlagged. The user's different gait is noticeable when waiting on long security lines, or making fast connections from one terminal to another. The user's pattern of movement may thereby be monitored by their dynamic digital twin, and may also be recognized as a variable in closed loop feedback cycles to a machine learning recommendation engine. The digital twin pattern is able to compare against multiple (e.g., two or more, three or more, four or more, five or more, ten or more, etc.) markers. One such marker may be able to interpret the variability in the user's gait as an adaptable factor, and incorporates the variability into the continuous system monitoring. Based on this interpretation of the user's gait, the system is able to seamlessly authenticate the user's access through security without any prompted input (e.g., in response to a request) from the user. This enables the user to minimize risk of identity theft while authenticating their identity through automated processes. This utilizes the knowledge corpus of the digital twin and machine learning models, allowing the user to accelerate through common gateways of travel with greater ease, speed, and confidence.

Again, various approaches herein are able to securely maintain and apply a variety of information that is unique to different users. This user information may be used to form a repository that allows for improved security procedures to be implemented. For instance, information collected from a user may be used to form a digital twin of that user that can be used to perform multi-factor authentication that dynamically adapts to the given situation. Implementations herein can thereby tune the details that are included in a particular multi-factor authentication, allowing for security procedures to be tailored for achieving improved performance in a variety of situations. This allows for a more robust security verification process to be implemented herein than conventionally achievable.

Certain aspects of the implementations described herein may further be improved as a result of implementing one or more machine learning models. As noted above, machine learning models may be used to evaluate additional information associated with requests that are received from users. For instance, machine learning models may incorporate where the request is received from, current system and/or network settings, predetermined security protocols, etc., to determine a combination of authentication factors that are implemented in a given situation. While it is preferred that the machine learning model is at least somewhat trained (e.g., supervised, unsupervised, semi-supervised, etc.) using performance data, it should also be noted that any desired type of machine learning model may be implemented, e.g., even an untrained machine learning model. The machine learning model may incorporate an artificial neural network, deep learning, a Naive Bayes classifier, etc., depending on the approach.

Over time, the machine learning models may thereby be able to identify preferred combinations of multi-factor authentication challenges to verify the identity of users. This understanding will allow the machine learning models to adapt to a variety of situations and determine an ideal combination of authentication factors that are able to verify a user's identity, while also minimizing the amount of input the user is prompted to provide, e.g., as would be appreciated by one skilled in the art after reading the present description. Some of the machine learning models implemented herein may even be able to adjust the combination of authentication factors by monitoring and reacting to changes in bandwidth limitations, excess compute latency in the system, network congestion, etc. Implementations may thereby be able to dynamically update to changing conditions, e.g., as described above.

It should also be noted that implementations herein may use an application program interface (API) that is configured to collect the outputs (e.g., vectors) of a layer that are to be used as an input for a subsequent layer of a process, e.g., such as a machine learning model. Accordingly, the API can accomplish a seamless transition of data between the layers in edge servers and the central server. APIs may thereby be used to help facilitate the movement of data and flow of a method, e.g., as would be appreciated by one skilled in the art after reading the present description.

It will be clear that the various features of the foregoing systems and/or methodologies may be combined in any way, creating a plurality of combinations from the descriptions presented above.

It will be further appreciated that various aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the various aspects described, the practical application or technical improvement over technologies found in the marketplace, or to enable others of ordinary skill in the art to understand the approaches disclosed herein.

What is claimed is:

1. A computer-implemented method, comprising:

in response to receiving a request from a user and determining that a recently verified token group exists, determining whether a supplemental authorization requirement associated with the user has been met;

in response to determining the supplemental authorization requirement has been met and that the user is authorized to issue the request, generating a multi-factor authentication challenge for the user, the multi-factor authentication challenge including a dynamic combination of available authentication factors corresponding to the user, wherein the dynamic combination of authentication factors includes (i) at least one user defined authentication factor, (ii) at least one biometric authentication factor, and (iii) at least one activity-based authentication factor;

using a digital twin of the user to satisfy at least one of the authentication factors in the multi-factor authentication challenge;

receiving inputs for remaining unsatisfied ones of the authentication factors in the multi-factor authentication challenge; and determining whether the inputs received satisfy the remaining unsatisfied ones of the authentication factors in the multi-factor authentication challenge.

2. The computer-implemented method of claim 1, wherein the inputs received include (i) user defined information, (ii) biometric information, and (iii) activity-based information collected from the user, wherein the user defined information, biometric information, and activity-based information collected from the user is hashed and randomized before being stored in memory, wherein one or more of the inputs received correspond to the at least one user defined authentication factor, wherein the one or more received inputs that correspond to the at least one user defined authentication factor are received directly from the user.

3. The computer-implemented method of claim 1, wherein one or more of the inputs received correspond to the at least one biometric authentication factor and/or the at least one activity-based authentication factor, wherein the one or more received inputs that correspond to the at least one biometric authentication factor and/or the at least one activity-based authentication factor are received from one or more sensors configured to collect biometric and/or activity-based information associated with the user.

4. The computer-implemented method of claim 1, comprising:

in response to determining that the inputs received satisfy the remaining unsatisfied ones of the authentication factors in the multi-factor authentication challenge, causing the request to be satisfied.

5. The computer-implemented method of claim 1, comprising:

in response to determining that the inputs received do not satisfy one or more of the remaining unsatisfied ones of the authentication factors in the multi-factor authentication challenge, causing the request to be denied.

6. The computer-implemented method of claim 1, comprising:

in response to determining the inputs received do not satisfy the multi-factor authentication challenge, generating an updated multi-factor authentication challenge having a second dynamic combination of the available authentication factors;

using the digital twin of the user to satisfy at least one of the authentication factors in the updated multi-factor authentication challenge; and issuing requests to the user for inputs for remaining unsatisfied ones of the authentication factors in the updated multi-factor authentication challenge.

7. The computer-implemented method of claim 1, wherein generating the multi-factor authentication challenge includes using a machine learning model to create the dynamic combination of authentication factors in the multi-factor authentication challenge, wherein a number of authentication factors in the multi-factor authentication challenge is based at least in part on a type of request that is received.

8. The computer-implemented method of claim 7, wherein generating the multi-factor authentication challenge for the user includes:

evaluating the type of request that is received and determining: a first number of user defined authentication factors, a second number of biometric authentication factors, and a third number of activity-based authentication factors, to use to generate the multi-factor authentication challenge;

selecting the first number of user defined authentication factors randomly from a list of known user defined authentication factors;

selecting the second number of biometric authentication factors randomly from a list of known biometric authentication factors;

selecting the third number of activity-based authentication factors randomly from a list of known activity-based authentication factors; and forming the multi-factor authentication challenge by combining the randomly selected first number of user defined authentication factors with the randomly selected second number of biometric authentication factors and the randomly selected third number of activity-based authentication factors to.

9. The computer-implemented method of claim 1, comprising:

in response to determining that: a recently verified token group does not exist and/or the supplemental authorization requirement associated with the user has not been met, determining whether compromised and/or altered credentials are present;

in response to determining compromised and/or altered credentials are present, determining whether there is sufficient information about the user available to create an alternate multi-factor authentication challenge; and in response to determining that there is sufficient information about the user available to create an alternate multi-factor authentication challenge, generating the alternate multi-factor authentication challenge for the user.

10. The computer-implemented method of claim 1, comprising:

in response to determining compromised and/or altered credentials are not present, determining one or more groups of information to use while generating the multi-factor authentication challenge for the user.

11. A computer program product, comprising a computer readable storage medium having program instructions embodied therewith, the program instructions readable by a processor, executable by the processor, or readable and executable by the processor, to cause the processor to:

in response to receiving a request from a user and determining that a recently verified token group exists, determine whether a supplemental authorization requirement associated with the user has been met;

in response to determining the supplemental authorization requirement has been met and that the user is authorized to issue the request, generate a multi-factor authentication challenge for the user, the multi-factor authentication challenge including a dynamic combination of available authentication factors corresponding to the user, wherein the dynamic combination of authentication factors includes (i) at least one user defined authentication factor, (ii) at least one biometric authentication factor, and (iii) at least one activity-based authentication factor, use a digital twin of the user to satisfy at least one of the authentication factors in the multi-factor authentication challenge;

receive inputs for remaining unsatisfied ones of the authentication factors in the multi-factor authentication challenge; and determine whether the inputs received satisfy the remaining unsatisfied ones of the authentication factors in the multi-factor authentication challenge.

12. The computer program product of claim 11, wherein one or more of the inputs received correspond to the at least one user defined authentication factor, wherein the one or more received inputs that correspond to the at least one user defined authentication factor are received directly from the user.

13. The computer program product of claim 11, wherein one or more of the inputs received correspond to the at least one biometric authentication factor and/or the at least one activity-based authentication factor, wherein the one or more received inputs that correspond to the at least one biometric authentication factor and/or the at least one activity-based authentication factor, are received from one or more sensors configured to collect biometric and/or activity-based information associated with the user.

14. The computer program product of claim 11, wherein the program instructions are readable and/or executable by the processor to cause the processor to:

in response to determining that the inputs received satisfy the remaining unsatisfied ones of the authentication factors in the multi-factor authentication challenge, cause the request to be satisfied.

15. The computer program product of claim 11, wherein the program instructions are readable and/or executable by the processor to cause the processor to:

in response to determining that the inputs received do not satisfy one or more of the remaining unsatisfied ones of the authentication factors in the multi-factor authentication challenge, cause the request to be denied.

16. The computer program product of claim 11, wherein the program instructions are readable and/or executable by the processor to cause the processor to:

in response to determining the inputs received do not satisfy the multi-factor authentication challenge, generate an updated multi-factor authentication challenge having a second dynamic combination of the available authentication factors;

using the digital twin of the user to satisfy at least one of the authentication factors in the updated multi-factor authentication challenge; and issuing requests to the user for inputs for remaining unsatisfied ones of the authentication factors in the updated multi-factor authentication challenge.

17. The computer program product of claim 11, wherein generating the multi-factor authentication challenge includes using a machine learning model to create the dynamic combination of authentication factors in the multi-factor authentication challenge, wherein a number of authentication factors in the multi-factor authentication challenge is based at least in part on a type of request that is received.

18. The computer program product of claim 11, wherein generating the multi-factor authentication challenge for the user includes:

evaluating a type of request that is received and determining: a first number of user defined authentication factors, a second number of biometric authentication factors, and a third number of activity-based authentication factors, to use to generate the multi-factor authentication challenge;

selecting the first number of user defined authentication factors randomly from a list of known user defined authentication factors;

selecting the second number of biometric authentication factors randomly from a list of known biometric authentication factors;

selecting the third number of activity-based authentication factors randomly from a list of known activity-based authentication factors; and forming the multi-factor authentication challenge by combining the randomly selected first number of user defined authentication factors with the randomly selected second number of biometric authentication factors and the randomly selected third number of activity-based authentication factors to.

19. A system, comprising:

a processor; and logic integrated with the processor, executable by the processor, or integrated with and executable by the processor, the logic being configured to:

in response to receiving a request from a user and determining that a recently verified token group exists, determine whether a supplemental authorization requirement associated with the user has been met;

in response to determining the supplemental authorization requirement has been met and that the user is authorized to issue the request, generate a multi-factor authentication challenge for the user, the multi-factor authentication challenge including a dynamic combination of available authentication factors corresponding to the user, wherein the dynamic combination of authentication factors includes (i) at least one user defined authentication factor, (ii) at least one biometric authentication factor, and (iii) at least one activity-based authentication factor;

use a digital twin of the user to satisfy at least one of the authentication factors in the multi-factor authentication challenge;

receive inputs for remaining unsatisfied ones of the authentication factors in the multi-factor authentication challenge; and determine whether the inputs received satisfy the remaining unsatisfied ones of the authentication factors in the multi-factor authentication challenge.

20. The system of claim 19, wherein the logic is configured to:

in response to determining the inputs received do not satisfy the multi-factor authentication challenge, generate an updated multi-factor authentication challenge having a second dynamic combination of the available authentication factors, using the digital twin of the user to satisfy at least one of the authentication factors in the updated multi-factor authentication challenge; and issuing requests to the user for inputs for remaining unsatisfied ones of the authentication factors in the updated multi-factor authentication challenge, wherein generating the multi-factor authentication challenge and the updated multi-factor authentication challenge includes using a machine learning model to create the dynamic combination of authentication factors and the second dynamic combination of authentication factors.

* * * * *